United States Patent
Armschat et al.

(10) Patent No.: US 11,378,465 B2
(45) Date of Patent: Jul. 5, 2022

(54) ASSEMBLY FOR DETERMINING THE TEMPERATURE OF A SURFACE

(71) Applicant: Siemens Energy Global GmbH & Co. KG, Munich (DE)

(72) Inventors: Christoph Armschat, Erlangen (DE); Uwe Weigt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/292,497

(22) PCT Filed: Nov. 9, 2018

(86) PCT No.: PCT/EP2018/080791
§ 371 (c)(1),
(2) Date: May 10, 2021

(87) PCT Pub. No.: WO2020/094240
PCT Pub. Date: May 14, 2020

(65) Prior Publication Data
US 2022/0018719 A1    Jan. 20, 2022

(51) Int. Cl.
*G01K 1/143*   (2021.01)
*G01K 1/16*    (2006.01)

(52) U.S. Cl.
CPC ............... *G01K 1/143* (2013.01); *G01K 1/16* (2013.01)

(58) Field of Classification Search
CPC .................................. G01K 1/143; G01K 1/16
See application file for complete search history.

(56) References Cited

U.S. PATENT DOCUMENTS

| | | | | |
|---|---|---|---|---|
| 4,177,375 A | * | 12/1979 | Meixner | H05B 3/141 219/439 |
| 4,246,787 A | * | 1/1981 | Harper | G01K 1/18 29/612 |
| 2004/0002655 A1 | * | 1/2004 | Bolorforosh | A61B 8/00 600/459 |
| 2004/0073397 A1 | * | 4/2004 | Matsuyama | G06F 30/23 702/136 |
| 2008/0170600 A1 | * | 7/2008 | Sattler | G01K 13/20 374/163 |
| 2009/0146295 A1 | * | 6/2009 | Narita | H01L 23/3677 257/720 |
| 2017/0095158 A1 | * | 4/2017 | Husheer | G01K 13/20 |
| 2020/0225096 A1 | * | 7/2020 | Ude | G01K 1/143 |

FOREIGN PATENT DOCUMENTS

| | | |
|---|---|---|
| DE | 19917372 A1 | 10/2000 |
| DE | 102015201155 A1 | 7/2016 |
| EP | 2329240 A1 | 6/2011 |
| GB | 2266771 A | 11/1993 |

* cited by examiner

*Primary Examiner* — Nathaniel T Woodward
*Assistant Examiner* — Philip L Cotey
(74) *Attorney, Agent, or Firm* — Laurence A. Greenberg; Werner H. Stemer; Ralph E. Locher

(57) ABSTRACT

An assembly for determining the temperature of a surface includes a first sensor unit which has a first temperature sensor. Furthermore, the assembly includes a first thermally conductive component, which connects the first sensor unit to the surface, and a second thermally conductive component, which connects the first sensor unit to a reference point spaced apart from the surface. A method for determining the temperature of a surface is also provided.

20 Claims, 4 Drawing Sheets

ASSEMBLY FOR DETERMINING THE TEMPERATURE OF A SURFACE

BACKGROUND OF THE INVENTION

Field of the Invention

The invention relates to an assembly for determining the temperature of a surface and to a method for determining the temperature of a surface.

Surface temperatures, for example temperatures of surfaces of comparatively hot components, often have to be determined in an industrial setting. The temperatures to be determined may be for example 80° C., 150° C., 200° C. or even higher. There is a risk that a sensor unit being used will be impaired or even damaged by the high temperatures. This problem is particularly apparent if, in addition to a temperature sensor, the sensor unit contains further electrical or electronic units, such as for example an electrical energy storage means or a wireless data transmission unit. This is conceivable, for example, in high-voltage systems where high temperatures can occur due to the high voltages, currents and/or converted electrical power levels involved. Since wired data transmission is often not desired due to the high voltage, it is conceivable to use wireless data transmission units as well as electrical energy storage means installed in the sensor unit for such temperature measurements. However, such electrical energy storage means (for example chemical energy storage means such as primary or storage batteries) have a greatly reduced service life at high temperatures. Wireless data transmission units are sensitive to high temperatures (due to the electronic components they contain).

SUMMARY OF THE INVENTION

The object of the present invention is to provide an assembly and a method with which the field of application of a sensor unit having a temperature sensor can be extended.

Said object is achieved according to the invention by an assembly and by a method as claimed in the independent claims. The dependent claims state advantageous developments of the assembly and of the method.

An assembly is disclosed for determining the temperature of a surface with
  a first sensor unit which has a first temperature sensor,
  a first thermally conductive element which (thermally) connects the first sensor unit to the surface,
  a second thermally conductive element which (thermally) connects the first sensor unit to a reference point spaced from the surface (for example in the surroundings of a component which includes the surface), (whereby a temperature which is between the temperature of the surface and the temperature of the reference point occurs at the first sensor unit). As a result, the first sensor unit (more precisely, the first temperature sensor of the first sensor unit) can be used to measure a temperature higher than that for which the first sensor unit is designed and to which the first sensor unit can be exposed. Depending on the configuration of the first thermally conductive element and the second thermally conductive element, it is possible to measure temperatures considerably higher than the maximum temperature that the first sensor unit is capable of measuring. The temperature of the reference point may for example be the temperature of a cooling medium of the component, in particular the temperature of the cooling air flowing around the component.

The assembly may be configured such that the first thermally conductive element and the second thermally conductive element form a heat divider. As a result, the temperature occurring at the first sensor unit is lower than the temperature of the surface.

The first thermally conductive element and the second thermally conductive element may be configured such that the steady-state temperature of the first sensor unit in degrees Celsius is between 20% and 70% of the temperature of the surface and in particular between 20% and 40% of the temperature of the surface. As a result, the temperature detection range of the assembly is considerably extended in comparison with the temperature detection range of the first sensor unit.

The assembly may also be configured such that the first thermally conductive element is arranged on one side of the first sensor unit and the second thermally conductive element on the opposite side of the first sensor unit. As a result, there is a comparatively unobstructed flow of heat from the surface via the first thermally conductive element, the first sensor unit and the second thermally conductive element to the reference point.

The assembly may also be configured such that the first thermally conductive element is arranged on a side of the first sensor unit facing the surface, and the second thermally conductive element on a side of the first sensor unit facing away from the surface. This also enables a comparatively unobstructed flow of heat.

The assembly may also be configured such that the first thermally conductive element and/or the second thermally conductive element in each case have a T-shaped cross-sectional surface. The first thermally conductive element and/or the second thermally conductive element may be thermally coupled to the surface, to the first sensor unit or to the reference point by means of the crossbar of the T. In other words, the crossbar of the T enables good heat transfer into or out of the first and second thermally conductive elements.

The assembly may also be configured such that the first thermally conductive element and/or the second thermally conductive element in each case have a double T-shaped cross-sectional surface. The two crossbars of the first and second thermally conductive elements here ensure good heat transfer into or out of the first and second thermally conductive elements.

The assembly may be configured such that the first thermally conductive element is a disk and/or the second thermally conductive element is a cap. Arranging the first sensor unit between the disk and the cap provides a very compact structure of the assembly.

The assembly may also be configured such that the second thermally conductive element has cooling fins. This enables good heat dissipation from the second thermally conductive element to the reference point (thus for example to the surroundings of the component which includes the surface). A steady flow of heat through the heat divider is ensured as a result.

The assembly may be configured such that the first sensor unit, the first thermally conductive element and/or the second thermally conductive element are thermally insulated from a fluid surrounding them, in particular from the air surrounding them. This reduces any potential distortion of the temperature determination by a fluid flowing past different points of the assembly at different speeds (for example streams of air at different speeds).

The assembly may also have a shielding element to provide shielding from thermal radiation, which shielding element is spaced from the first sensor unit, the first thermally conductive element and/or the second thermally conductive element. This shielding element reduces the distorting influence of thermal radiation which reaches the assembly (for example through the surrounding fluid, in particular air).

The assembly may have a second sensor unit for determining the temperature of the reference point, wherein the second sensor unit has a second temperature sensor, and the second sensor unit is arranged on a side of the second thermally conductive element facing away from the first sensor unit. As a result, the temperature of the reference point can be determined and the assembly may be particularly compact.

The assembly may also have a second sensor unit for determining the temperature of the reference point, wherein the second sensor unit is fastened to the surface by means of a spacer. The spacer ensures a gap between the surface and the second sensor unit. As a result, the distorting influence of the (hot) surface on the determination of the temperature of the reference point can be kept low.

The assembly may be configured such that the spacer is a bracket of a strip-shaped material. The strip-shaped material minimizes unwanted thermal conduction between the surface and the second sensor unit.

The assembly may also be configured such that the first thermally conductive element has a first thermal resistance, and the thermal resistance of the spacer is greater, in particular at least 5 times greater, than the first thermal resistance. This ensures that the distorting influence of the surface on the second sensor unit is relatively low.

The assembly may also be configured such that the surface is the surface of a component, in particular the surface of a component of a high-voltage installation. This advantageously in particular allows the temperature of the surface of a component of the high-voltage installation to be determined.

The assembly may also be configured such that the first sensor unit (in addition to the first temperature sensor) has an electrical energy storage means and/or a wireless data transmission unit. Such a sensor unit may be, for example, a radio sensor unit which has an energy storage means and/or a radio data transmission unit. By means of the wireless data transmission unit, the measured values (or values derived from the measured values) can be easily transmitted from the first sensor unit to a suitable receiver. This is advantageous in particular in the case of a high-voltage installation.

A method is furthermore disclosed for determining the temperature of a surface by means of a first sensor unit which has a first temperature sensor, a first thermally conductive element which (thermally) connects the first sensor unit to the surface, and a second thermally conductive element which (thermally) connects the first sensor unit to a reference point spaced from the surface (for example in the surroundings of a component which includes the surface), wherein in the method
  the first temperature sensor measures a first temperature which arises at the location of the first temperature sensor, wherein the first temperature is between the temperature of the surface and the temperature of the reference point, and
  the temperature of the surface is determined from the measured first temperature and the temperature of the reference point. For example, the temperature of the surface may be calculated from the measured first temperature and the temperature of the reference point.

The method may proceed such that the temperature of the surface is determined from the measured first temperature and the temperature of the reference point by means of previously known thermal properties of the first thermally conductive element and of the second thermally conductive element. The previously known thermal properties may be, for example, the thermal resistance of the first thermally conductive element and the thermal resistance of the second thermally conductive element.

The method may proceed such that the temperature of the surface is determined from the measured first temperature and the temperature of the reference point by means of a previously known dependency of the temperature of the surface on the measured first temperature at the respective temperature of the reference point. The previously known dependency may, for example, have been determined in advance in laboratory testing.

The method may also proceed such that the previously known dependency is stored as related values in a table or in an electronic memory. Advantageously, the temperature of the surface may then simply be read out from the table or from the memory without requiring complex calculations for this purpose.

The method may also proceed such that the temperature of the reference point is measured by means of a second temperature sensor. As a result, the temperature of the reference point can be kept permanently updated.

The described assembly and the described method have the same or similar advantages.

The following exemplary embodiments illustrate the invention in greater detail. Identical reference signs refer to identical or equivalently acting elements.

DETAILED DESCRIPTION OF THE INVENTION

Figure 1:
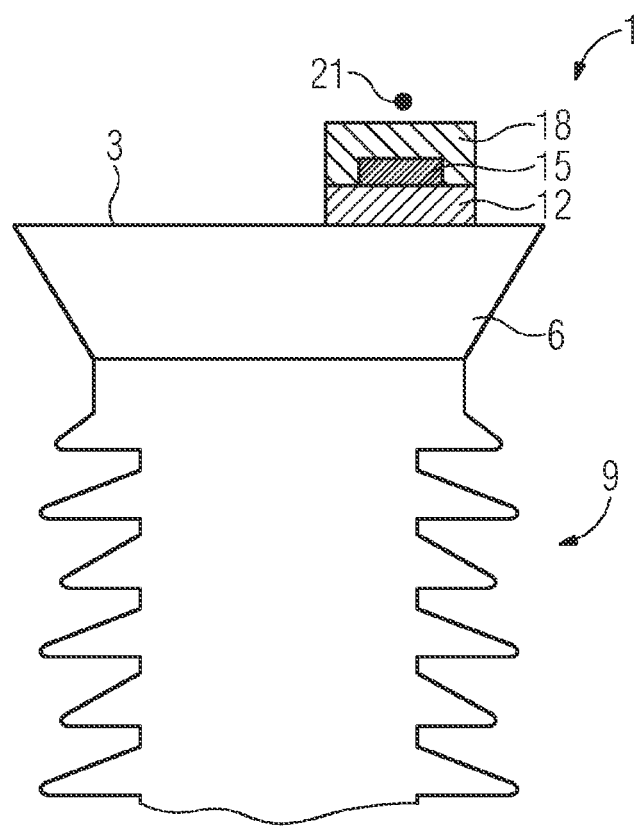
FIG. 1 shows a first exemplary embodiment of an assembly which is arranged on the surface of a high-voltage component.

FIG. 1 shows a partially sectional representation of an exemplary embodiment of an assembly 1 for determining a temperature of a surface 3 of a component 6. The component 6 may in particular be a component of a high-voltage installation (high-voltage component 6). In the exemplary embodiment, the component is a flange 6 (more precisely a head flange 6) of a surge arrester 9, as is in particular used in high-voltage engineering. The flange 6 and surge arrester 9 should, however, only be taken to be examples; in another exemplary embodiment, the temperature of another surface may, of course, also be determined by means of the assembly 1.

The assembly 1 has a first thermally conductive element 12, a first sensor unit 15 and a second thermally conductive element 18. The first sensor unit 15 has a first temperature sensor 803 (cf. FIG. 8) with which the temperature of the first sensor unit 15 can be measured. The first sensor unit 15 furthermore has an electrical energy storage means 806 in order at least temporarily to supply the first sensor unit 15 with electrical energy. The first sensor unit 15 furthermore has a wireless data transmission unit 809 (for example a radio data transmission unit) for wirelessly transmitting measured values of the first temperature sensor 803 (or values derived from these measured values) to a receiver.

The first thermally conductive element 12 thermally connects the surface 3 of the component 6 to the first sensor unit 15. In the exemplary embodiment, the first thermally conductive element 12 is configured as a disk 12 which is arranged between the surface 3 and the first sensor unit 15. The second thermally conductive element 18 is configured in the exemplary embodiment as a cap 18. This cap 18 covers the first sensor unit 15. Adjacent to the second thermally conductive element 18 is a reference point 21, the temperature of which is known. This reference point 21 is located on the side of the assembly 1 facing away from the surface 3. In other words, on one side of the assembly 1 is the surface 3 with the temperature to be determined and on the opposite side of the assembly 1 is the reference point 21 with the known temperature. The temperature of the reference point 21 (reference temperature $\vartheta_{Ref}$) may for example be determined by means of a further sensor unit. The temperature of the reference point 21 may, for example, be the air temperature in the surroundings of the component 6, in particular the air temperature in the surroundings of the second thermally conductive element 18.

The second thermally conductive element 18 thus connects the first sensor unit 15 to the reference point 21. The first thermally conductive element 12 and the second thermally conductive element 18 form a heat divider. Heat (heat flow) flows from the surface 3 through the first thermally conductive element 12 and the second thermally conductive element 18 to the reference point 21. The first thermally conductive element 12 has a first thermal resistance $R_{W1}$ and the second thermally conductive element 18 has a second thermal resistance $R_{W2}$. At the first sensor unit 15, a temperature is established (in the steady state) which is between the temperature of the surface 3 and the temperature of the reference point 21. This temperature may be measured by means of the first temperature sensor of the first sensor unit 15. The temperature of the surface 3 can be determined from the measured temperature. The following relationship applies here:

$$\vartheta_o = k(\vartheta_{sens} - \vartheta_{Ref}).$$

$\vartheta_o$ is here the temperature of the surface 3, $\vartheta_{sens}$ the temperature measured by the first temperature sensor of the first sensor unit, $\vartheta_{Ref}$ the temperature of the reference point and k a conversion factor (or conversion function if better accuracy over a wider measuring range is required).

The following values may be present in the exemplary embodiment: $\vartheta_o=110°$ C., $\vartheta_{sens}=70°$ C., $\vartheta_{Ref}=38°$ C. In this exemplary embodiment, a temperature difference of 40K ($\Delta t1=40K$) arises across the first thermally conductive component 12 and a temperature difference of 32K ($\Delta t2=32K$) arises across the second thermally conductive element 18. It is thus apparent that a heat divider is formed in the assembly 1. A temperature $\vartheta_{sens}$ occurs at the first sensor unit 15 which is between the temperature of the surface $\vartheta_o$ and the temperature of the reference point $\vartheta_{Ref}$.

As a result, the temperature of the surface $\vartheta_o=110°$ C. can, for example, even be determined if the measuring range of the first sensor unit 15 finishes at 80° C. Thanks to the thermally dividing effect of the assembly 1, the temperature arising at the first sensor unit 15 $\vartheta_{sens}$ is only 70° C. which is still within the permissible measuring range of the first sensor unit 15.

Figure 2:
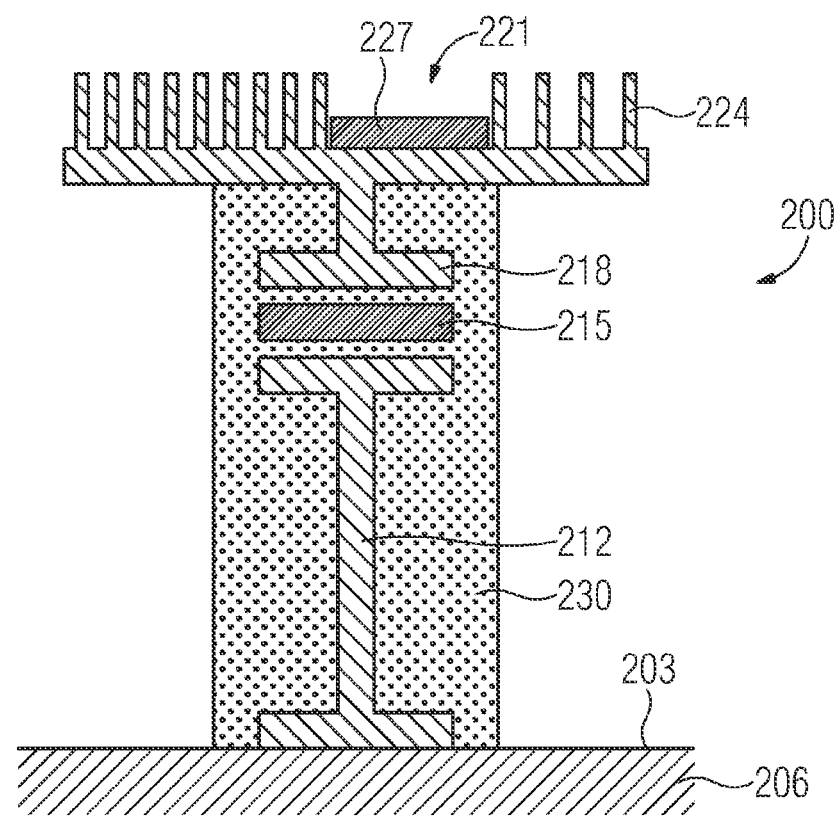
FIG. 2 shows a second exemplary embodiment of an assembly with a first thermally conductive element and a second thermally conductive element, each of which have a double T-shaped cross-sectional surface.

FIG. 2 shows a partially sectional representation of a further exemplary embodiment of an assembly 200 for determining the temperature of a surface 203 of a component 206. The assembly 200 has a first thermally conductive element 212, a first sensor unit 215 and a second thermally conductive element 218. The first thermally conductive element 212 thermally connects the surface 203 of the component 206 to the first sensor unit 215. The second thermally conductive element 218 thermally connects the first sensor unit 215 to a reference point 221 spaced from the surface 203. The first thermally conductive element 212 has a first thermal resistance $R_{W1}$ and the second thermally conductive element 218 has a second thermal resistance $R_{W2}$. At the first sensor unit 215, a temperature is established in the steady state which is between the temperature of the surface 203 and the temperature of the reference point 221. For example, the temperature $\vartheta_o$ of the surface may amount to 180° C. (surface temperature $\vartheta_o=180°$ C.). The temperature of the reference point 221 may amount to 49° C. in the example (reference temperature $\vartheta_{Ref}=49°$ C.). A temperature of 70° C. is thereupon established at the first sensor unit 215 (measured temperature $\vartheta_{sens}=70°$ C.). This temperature $\vartheta_{sens}$ is measured by means of the first sensor unit 215. The temperature $\vartheta_o$ of the surface 203 can then be determined from this temperature $\vartheta_{sens}$ and the known temperature $\vartheta_{Ref}$ of the reference point 221 and the known thermal characteristics (for example the thermal resistances) of the first thermally conductive element 212 and the second thermally conductive element 218.

In this example, the steady-state temperature $\vartheta_{sens}$ of the first sensor unit 215 is approx. 39% of the temperature $\vartheta_o$ of the surface 203. In general, the first thermally conductive element and the second thermally conductive element may be configured such that the steady-state temperature $\vartheta_{sens}$ of the first sensor unit in degrees Celsius amounts to between 20% and 70% of the temperature of the surface, in particular between 20% and 40% of the temperature of the surface.

In the exemplary embodiment, the first thermally conductive element 212 has a double T-shaped cross-sectional surface. A first crossbar of the first thermally conductive element 212 here rests against the surface 203 and ensures good thermal transfer between the surface 203 and the first thermally conductive element 212. A second crossbar of the first thermally conductive element 212 rests against the first sensor unit 215 and ensures good heat transfer between the first thermally conductive element 212 and the first sensor unit 215. The second thermally conductive element 218 likewise has a double T-shaped cross-sectional surface. A first crossbar of the second thermally conductive element 218 here rests against the first sensor unit 215 and ensures good heat transfer between the first sensor unit 215 and the second thermally conductive element 218. A second crossbar of the second thermally conductive element 218 is provided with cooling fins 224. These cooling fins 224 enable good heat dissipation from the second thermally conductive element 218 into the surroundings, for example into the air surrounding the second thermally conductive element 218. The first thermally conductive element 212 is thus dumbbell-shaped in the example. This also applies in principle to the second thermally conductive element 218, wherein the "weight plates" of the "dumbbell" have different sizes.

The reference point 221 may be located on the side of the second thermally conductive element 218 facing away from the first sensor unit, in particular adjacent to the cooling fins 224 of the second thermally conductive element 218. The reference point 221 may rest against the surface of the second thermally conductive element 218, such that the temperature of the reference point 221 then corresponds to the temperature of the surface of the second thermally conductive element 218 on the side facing away from the first sensor unit. This is the case shown in the exemplary embodiment. A second sensor unit 227 is here arranged on the surface of the second thermally conductive element 218 on the side facing away from the first sensor unit 215. The second sensor unit 227 determines the temperature of the reference point 221, which here corresponds to the temperature of the surface of the second thermally conductive element 218. This is the lowest temperature of the surface of the second thermally conductive element 218. The second sensor unit 227 may be of similar construction to the first sensor unit 215. In particular, the second sensor unit 227 has a second temperature sensor for measuring the temperature.

Measuring the reference temperature on the cooling fins of the second thermally conductive element (as shown in FIG. 2) may in particular be advantageous if the air surrounding the component is not moving and therefore greater temperature differences may occur in the ambient air. In this case, a measurement of the reference temperature spaced from the second thermally conductive element 218 may be too inaccurate.

At variance with the representation in FIG. 2, the second sensor unit may however also be arranged spaced from the second thermally conductive element 218. A second sensor unit arranged in this manner may, for example, measure the temperature of the air in the surroundings of the second thermally conductive element 218 or the temperature of the air in the surroundings of the cooling fins 224. This temperature may also be used as a reference temperature.

The heat divider may advantageously be constructed such that the heat conduction paths have a comparatively low heat capacity. This prevents the heat divider from responding too sluggishly to changes in temperature (optimization of the delay time constant of the temperature measurement). This is achieved, for example, by the first thermally conductive element 212 and by the second thermally conductive element 218 with the T-shaped or double T-shaped cross-sectional surface.

In order also to keep the influence of different flow velocities of the cooling medium (for example the surrounding cooling air) low, the heat conduction paths of the assembly may be configured in such a way that they have a comparatively small heat capacity. Furthermore, the heat conduction paths may be provided with heat insulation 230 (thermal insulation), for example with a rigid foam jacket 230. In contrast, the contact region of the second thermally conductive element with the surroundings is configured with very low thermal contact resistance. This is achieved, for example, by the cooling fins 224. The temperature of the second thermally conductive element at the cooling fins is thus roughly equal to the temperature of the reference point 221 (for example ambient temperature).

In another exemplary embodiment, the first thermally conductive element and/or the second thermally conductive element may also in each case have a T-shaped cross-sectional surface. These elements would then, for example, not have the crossbars facing the first sensor unit, but said crossbars could instead also be omitted. In the context of the sectional representation of FIG. 2, reference was made above to crossbars; these crossbars correspond in the actual three-dimensional representation of the thermally conductive elements 212 and 218 to areas which for example rest against the first sensor unit 215 or the surface 203.

In the previously described exemplary embodiments, the temperature of a surface of a component was determined. In other exemplary embodiments, however, the temperature of another surface may also be determined, for example the temperature of a surface of a fluid, thus in particular the temperature of a surface of a liquid or gas.

Figure 3:
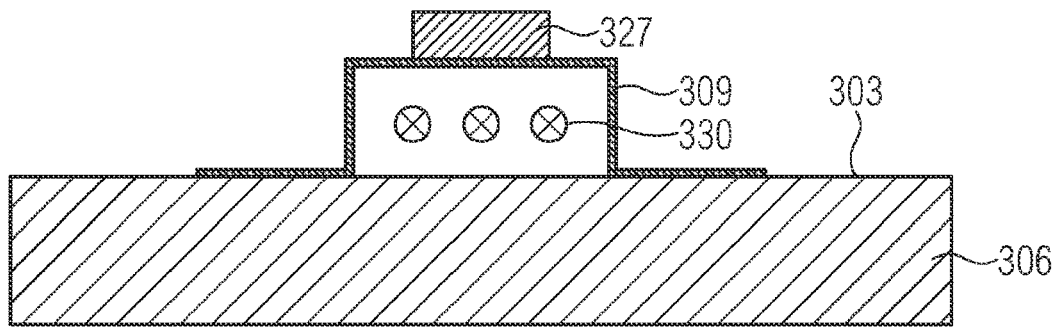
FIG. 3 shows a partially sectional side view of an exemplary embodiment of a second sensor unit which is mounted by means of a spacer on a surface.
Figure 4:
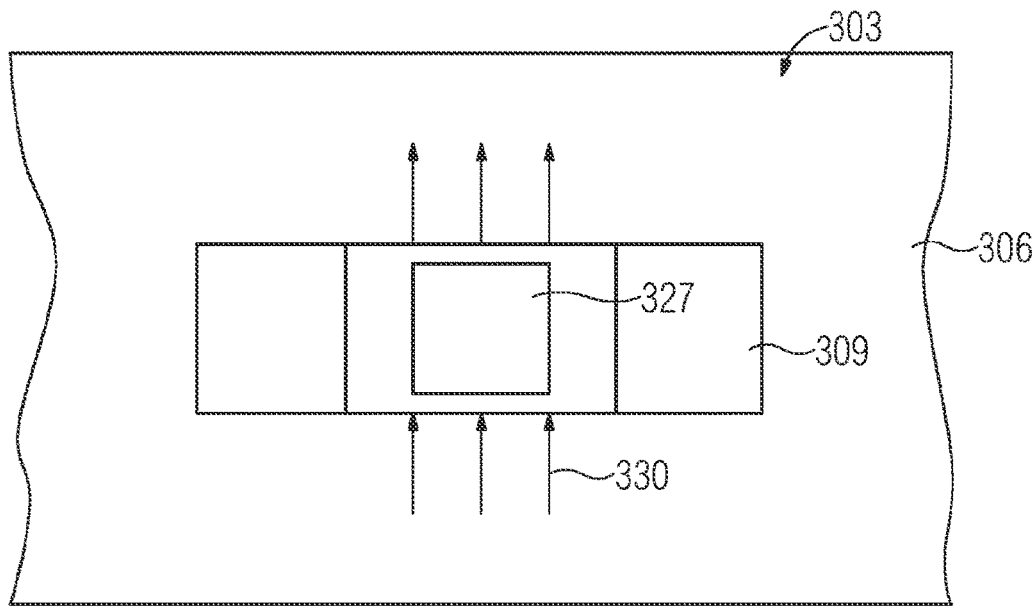
FIG. 4 shows the second sensor unit of FIG. 3 in a view from above.
Figure 5:
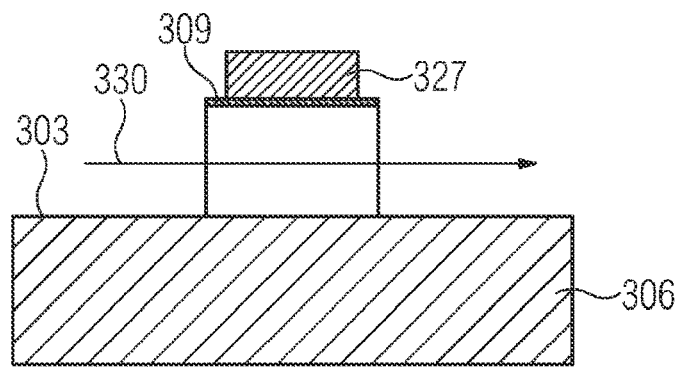
FIG. 5 shows the second sensor unit of FIG. 3 in a partially sectional side view from another side.

FIGS. 3-5 show a further exemplary embodiment of a second sensor unit 327 for measuring the reference temperature $\vartheta_{Ref}$. FIG. 3 shows a partially sectional representation of a view from the side, FIG. 4 a view from above and FIG. 5 a second side view, in which the viewing direction is rotated by 90° compared to the viewing direction of FIG. 3.

A spacer 309 bearing the second sensor unit 327 is arranged on the surface 303 of a component 306. The spacer 309 ensures that the second sensor unit 327 is spaced from the surface 303 and has no direct thermal contact with the surface 303. The spacer 309 consists of a comparatively poorly thermally conductive material (high thermal resistance), such that the temperature of the second sensor unit 327 is only negligibly distorted by heat conduction via the spacer 309. Instead, the second sensor unit 327 measures the reference temperature $\vartheta_{Ref}$, which in the exemplary embodiment corresponds to the near-surface temperature. If the surface 303 is arranged in air, the reference temperature $\vartheta_{Ref}$ then corresponds to the near-surface air temperature. The air 330 flowing along the surface 303 is symbolically represented by arrows 330 in FIGS. 3-5. In particular, this allows the cooling conditions for the component to be determined.

In the exemplary embodiment, the spacer 309 takes the form of a bracket which leaves a passage between the surface 303 and a connecting piece of the spacer 309. Air 330 flows between the surface 303 and the connecting piece (i.e. through the stated passage). The spacer 309 may also be denoted spacing bracket 309 which provides a space/gap between the second sensor unit 327 and the surface 303. In the exemplary embodiment, the spacer 309 consists of a strip-shaped material, preferably an electrically insulating material with low permittivity (low dielectric conductivity). The strip-shaped material is here comparatively thin, which contributes to the (desired) relatively poor thermal conductivity of the spacer. There is thus a space, which may in particular take the form of an air gap, between the surface 303 and the second sensor unit 327. This space/air gap thermally and/or electrically decouples the measurement of the reference temperature by means of the second sensor unit 327 from the component on the surface of which the spacer 309 is arranged. As a result, the reference temperature (for example the air temperature of the cooling air surrounding the surface) can be measured in the immediate vicinity or at a defined distance from the surface 303 of the component 306. The reference temperature $\vartheta_{Ref}$ may be measured, for example, in the vicinity of the cap-shaped second thermally conductive element 18 (cf. FIG. 1), in the vicinity of printed circuit boards with heat-generating elements or in the vicinity of a metallic surface of the component.

Measuring the reference temperature by means of the spacer bearing the second sensor unit in particular has the advantage that a better correlation is achieved between comparative measurements of the reference temperature during testing where the air temperature distribution is uniform and measurements in the field where the cooling air temperature distribution is highly non-uniform (for example in tall tower structures). The values determined during testing then more accurately correspond to the values actually occurring in the field. As a consequence, meaningful data can in particular be obtained, for example about power loss in the actual operating environment.

In the exemplary embodiment, the thermal resistance of the spacer 309 is greater than the first thermal resistance of the first thermally conductive element. In particular, the thermal resistance of the spacer 309 may be at least five times greater than the first thermal resistance of the first thermally conductive element. This ensures that the measurement of the reference temperature by means of the second sensor unit 327 is only slightly distorted by the temperature of the surface 303.

Figure 6:
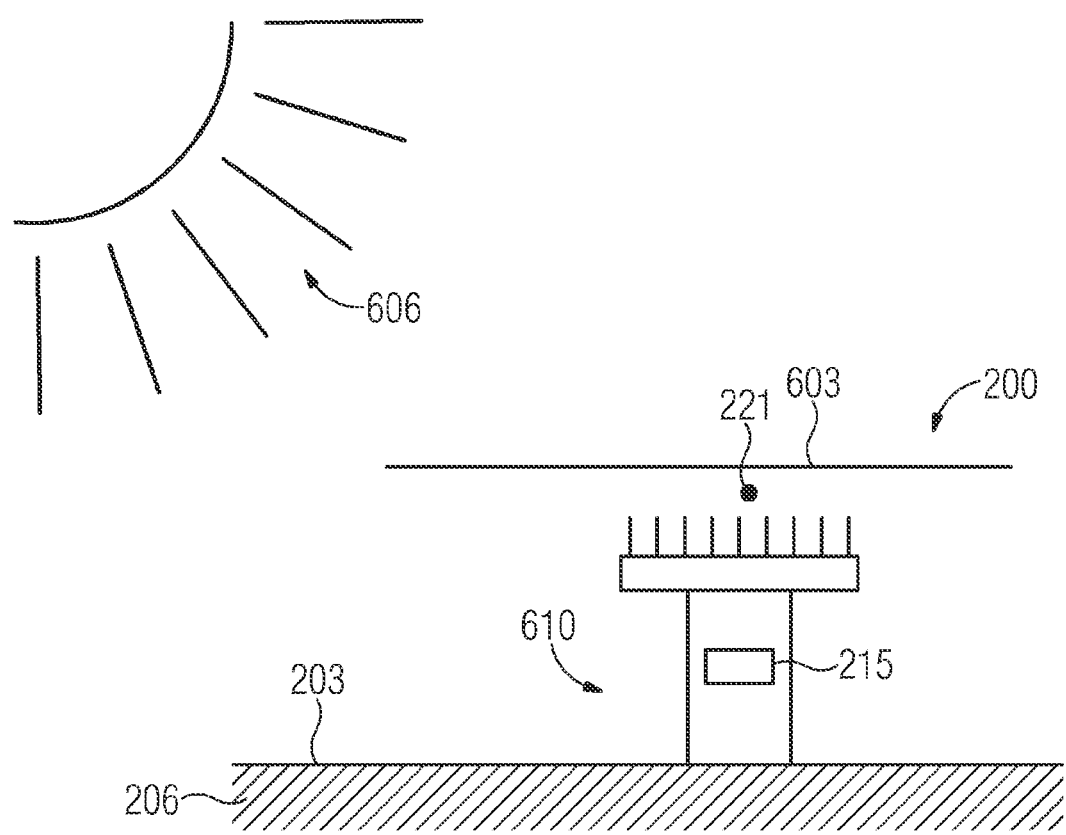
FIG. 6 shows an exemplary embodiment of an assembly with a shielding element.

FIG. 6 shows an exemplary embodiment of the assembly 200 for determining the temperature of the surface 203 of the component 206 with a shielding element 603. This shielding element serves to provide shielding from thermal radiation which does not originate from the component 206, but from another heat emitter 606. Such thermal radiation is also referred to as extraneous thermal radiation. In the exemplary embodiment of FIG. 6, the further heat emitter 606 is shown as the sun. However, such a further heat emitter 606 may also be formed, for example, by hot surfaces of adjacent components.

The shielding element 603 serves to shield the first sensor unit, the first thermally conductive element and/or the second thermally conductive element from thermal radiation from the further heat emitter 606. The shielding element 603 is spaced from the first sensor unit, the first thermally conductive element and/or the second thermally conductive element. The shielding element 603 may, for example, be fastened to the surface 203 of component 206 or to another fixed point in the surroundings of the component. The shielding element 603 may in the simplest case be a plate (shielding plate). The shielding element is arranged between the further heat emitter 606 and the heat divider 610 with the first sensor unit 215. The shielding element 603 may in particular have the function of a "sunshade"; i.e. it provides protection from heat radiation which would distort the determination of the temperature of the surface 203.

The shielding element 603 may advantageously be on the side of the heat divider from which the interfering extraneous heat radiation acts. The determination of the temperature of the surface 203 is consequently decoupled from distorting external heat inputs. The shielding element 603 (for example the shielding plate) may optionally be radiation-reflective and/or white in color. The shielding element 603 may in particular be produced from a thin nonmetallic material which has low permittivity (low dielectric conductivity).

The shielding element 603 therefore only slightly impairs the wireless transmission of data from the first sensor unit.

The first temperature sensor thus measures a first temperature $\vartheta_{sens}$ which has become established at the location of first sensor unit. In the steady state, this first temperature $\vartheta_{sens}$ is between the temperature of the surface $\vartheta_o$ and the temperature of the reference point $\vartheta_{Ref}$. The temperature of the reference point $\vartheta_{Ref}$ is known or is measured by means of the second temperature sensor of the second sensor unit. The temperature of the surface $\vartheta_o$ may then be determined from the measured first temperature $\vartheta_{sens}$ and the measured temperature of the reference point $\vartheta_{Ref}$. This determination of the temperature $\vartheta_o$ of the surface may proceed by means of previously known thermal characteristics of the first thermally conductive element and the second thermally conductive element. These previously known thermal properties may in each case be the previously known thermal resistance of the first thermally conductive element and of the second thermally conductive element. The temperature of the surface may be calculated by means of these thermal resistances as is described below.

Figure 7:
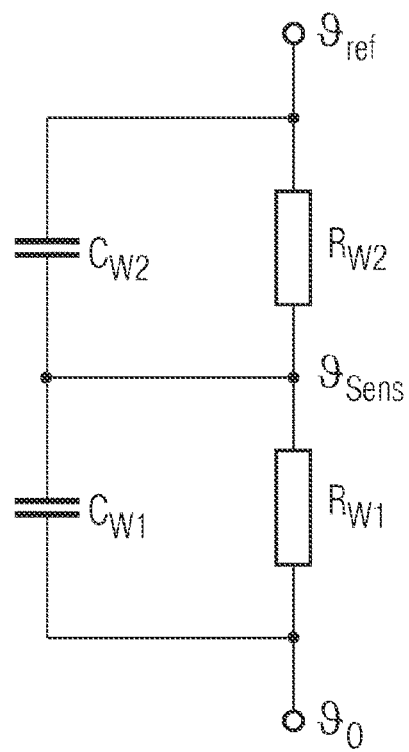
FIG. 7 shows an exemplary embodiment of a thermal model of the assembly.

FIG. 7 shows a model equivalent thermal circuit diagram for the heat divider. $R_{W1}$ is here the thermal resistance of the first thermally conductive element, $R_{W2}$ the thermal resistance of the second thermally conductive element, $C_{W1}$ the heat capacity of the first thermally conductive element and $C_{W2}$ the heat capacity of the second thermally conductive element. In the steady state, the heat capacities $C_{W1}$ and $C_{W2}$ can be disregarded. The following relationship approximately applies in the steady state:

$$(\vartheta_o - \vartheta_{Ref}) = (\vartheta_{sens} - \vartheta_{Ref}) R_{W1} + R_{W2}/R_{W2}$$

The temperature $\vartheta_o$ of the surface can be determined therefrom.

However, for determining the temperature of the surface, there is no need for the thermal resistance $R_{W1}$ of the first thermally conductive element and the thermal resistance $R_{W2}$ of the second thermally conductive element to be explicitly known. Instead, it is also possible for the dependency of the temperature $\vartheta_o$ of the surface on the measured first temperature $\vartheta_{sens}$ to have been determined instrumentally in the laboratory for a similar assembly at various temperatures $\vartheta_{Ref}$ of the reference point. This previously known dependency may for example be stored in the form of related values in a table (look-up table). The respective value of the temperature of the surface which corresponds to the measured first temperature may then be determined from this table (without any need for arithmetic calculations).

Figure 8:
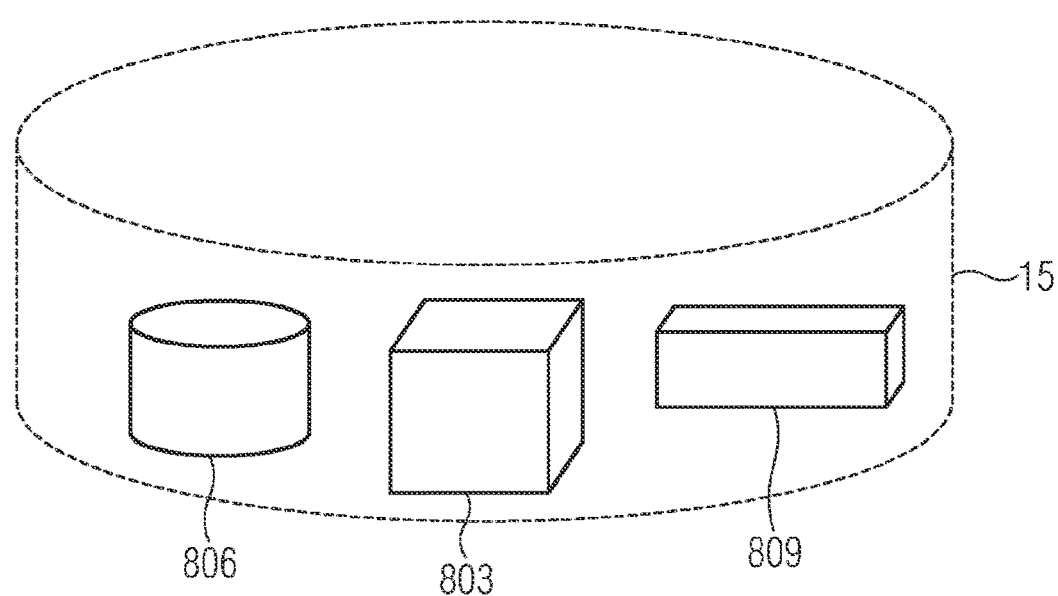
FIG. 8 shows an exemplary embodiment of a sensor unit.

FIG. 8 is a schematic representation of an exemplary embodiment of the first sensor unit 15 or 215. The second sensor unit 227, 327 may be of identical structure. The first sensor unit 15 has the first temperature sensor 803, the electrical energy storage means 806 and the wireless data transmission unit 809.

An assembly and a method for determining the temperature of a surface have been described. The heat divider here has the first thermally conductive element and the second thermally conductive element. By means of the heat divider, it is also possible to determine a temperature which is so high that it would damage the first sensor unit if it were to act directly on the first sensor unit. The heat divider thus distinctly extends the measuring range of the assembly relative to the measuring range of the first sensor unit.

The use of a heat divider to limit the temperature of the first sensor unit has been described. The heat divider enables the measurement of high temperatures of the surface, which are above the permissible measuring range of the first sensor unit. To this end, the first sensor unit is installed within the heat divider. The temperature of the first sensor unit is limited by the heat divider. This proceeds in particular by limiting heat flow: one side of the sensor unit is connected in heat-limiting manner to the surface and the other side of the sensor unit is connected in heat-limiting manner to the temperature of the reference point (for example to the cool ambient air). The current temperature of the ambient air (i.e.

the temperature of the reference point) can here be measured with a separate sensor/sensor unit.

The second thermally conductive element of the heat divider may be a temperature shielding element (for example a cap or top cap). This cap reduces heat transfer to the reference point (i.e. for example to the ambient air). The first thermally conductive element may for example take the form of a heat flow-limiting disk (which may also be denoted backing disk). This disk does not transmit all the heat from the surface to be measured to the first sensor unit. Instead, there is a balanced flow of heat through the disk, through the first sensor unit and through the cap. By means of a conversion function, the temperature of the surface can be determined from the first temperature measured by the first sensor unit and the known temperature of the reference point.

The heat divider may in particular be calibrated before use. To this end, the component having the surface with the temperature to measured and with the heat divider arranged on the surface may be heated, for example under laboratory conditions. As heating proceeds, the temperature of the surface is determined by means of a direct measurement and, together with the temperature measured by the first sensor unit 215 and the reference temperature of the reference point, saved and stored in a measurement series. The reference temperature used may in particular be the temperature of the cooling fins of the second thermally conductive element 218. These measurement series can be determined and stored for various reference temperatures (ambient temperatures). A transfer function (conversion function) for the heat divider can be determined from these measurement series. These measurement series then form a table which stores related values which describe the previously known dependency of the individual temperatures of the heat divider. Alternatively, the temperature of the surface may however also be determined by calculation, as described in connection with FIG. 7. In particular, to achieve high accuracy, the temperature model can be stored as a bundle of values for the respective reference temperature and subsequently be taken into account/referenced during the actual measurement.

An assembly and a method for determining the temperature of a surface have been described, in which a first sensor unit with a first temperature sensor is integrated in a heat divider. As a result, the first temperature sensor of the first sensor unit can even determine surface temperatures if the temperature of the surface is outside the measurement range of the first sensor unit. As a result, it is possible to use inexpensive sensor units which have only a limited temperature range. Special technology for elevated temperatures and/or costly materials and equipment are advantageously not required.

The invention claimed is:

1. An assembly for determining a temperature of a surface, the assembly comprising:
   a first sensor unit having a first temperature sensor;
   a first thermally conductive element connecting said first sensor unit to the surface; and
   a second thermally conductive element connecting said first sensor unit to a reference point spaced from the surface;
   said first thermally conductive element and said second thermally conductive element being configured to set a steady-state temperature of said first sensor unit in degrees Celsius between 20% and 70% of a temperature of the surface.

2. The assembly according to claim 1, wherein said first thermally conductive element and said second thermally conductive element are configured to set a steady-state temperature of said first sensor unit in degrees Celsius between 20% and 40% of a temperature of the surface.

3. The assembly according to claim 1, wherein said first thermally conductive element and said second thermally conductive element form a heat divider.

4. The assembly according to claim 1, wherein said first thermally conductive element is disposed on one side of said first sensor unit and said second thermally conductive element is disposed on an opposite side of said first sensor unit.

5. The assembly according to claim 1, wherein said first thermally conductive element is disposed on a side of said first sensor unit facing towards the surface, and said second thermally conductive element is disposed on a side of said first sensor unit facing away from the surface.

6. The assembly according to claim 1, wherein at least one of said first thermally conductive element or said second thermally conductive element has or have a T-shaped or a double T-shaped cross-sectional surface.

7. The assembly according to claim 1, wherein at least one of said first thermally conductive element is a disk or said second thermally conductive element is a cap.

8. The assembly according to claim 1, wherein said second thermally conductive element has cooling fins.

9. The assembly according to claim 1, wherein at least one of said first sensor unit, said first thermally conductive element or said second thermally conductive element is or are thermally insulated from a fluid or air surrounding them.

10. The assembly according to claim 1, which further comprises a shielding element providing shielding from thermal radiation, said shielding element being spaced from at least one of said first sensor unit, said first thermally conductive element or said second thermally conductive element.

11. The assembly according to claim 1, which further comprises a second sensor unit for determining a temperature of the reference point, said second sensor unit having a second temperature sensor, and said second sensor unit being disposed on a side of said second thermally conductive element facing away from said first sensor unit.

12. The assembly according to claim 1, which further comprises a second sensor unit for determining a temperature of the reference point, and a spacer or a bracket formed of a strip-shaped material fastening said second sensor unit to the surface.

13. The assembly according to claim 12, wherein said first thermally conductive element has a first thermal resistance, and said spacer has a thermal resistance being greater than said first thermal resistance.

14. The assembly according to claim 1, wherein the surface is a surface of a component or a surface of a component of a high-voltage installation.

15. The assembly according to claim 1, wherein said first sensor unit has at least one of an electrical energy storage device or a wireless data transmission unit.

16. A method for determining a temperature of a surface, the method comprising:
   providing a first sensor unit having a first temperature sensor, a first thermally conductive element connecting the first sensor unit to the surface, and a second thermally conductive element connecting the first sensor unit to a reference point spaced from the surface;
   using the first thermally conductive element and the second thermally conductive element to set a steady-state temperature of the first sensor unit in degrees Celsius between 20% and 70% of a temperature of the surface;

using the first temperature sensor to measure a first temperature arising at a location of the first temperature sensor, the first temperature being between the temperature of the surface and a temperature of the reference point; and determining the temperature of the surface from the measured first temperature and the temperature of the reference point.

17. The method according to claim 16, which further comprises using the first thermally conductive element and the second thermally conductive element to set a steady-state temperature of the first sensor unit in degrees Celsius between 20% and 40% of a temperature of the surface.

18. The method according to claim 16, which further comprises determining the temperature of the surface from the measured first temperature and the temperature of the reference point by using previously known thermal properties of the first thermally conductive element and of the second thermally conductive element.

19. The method according to claim 16, which further comprises determining the temperature of the surface by using a previously known dependency of the temperature of the surface on the measured first temperature and the temperature of the reference point at a respective temperature of the reference point and saving the previously known dependency as related values in a table.

20. The method according to claim 16, which further comprises using a second temperature sensor to measure the temperature of the reference point.

\* \* \* \* \*